US009767286B2

(12) United States Patent
Bousquet (10) Patent No.: US 9,767,286 B2
(45) Date of Patent: *Sep. 19, 2017

(54) ELECTRONIC MODULE FOR MAKING A MESSAGE ACCESSIBLE TO A TARGETED OPERATING SYSTEM

(71) Applicant: OBERTHUR TECHNOLOGIES, Colombes (FR)

(72) Inventor: Nicolas Bousquet, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,914

(22) Filed: Nov. 26, 2013

(65) Prior Publication Data

US 2014/0150093 A1    May 29, 2014

(30) Foreign Application Priority Data

Nov. 27, 2012 (FR) ..................... 12 61302

(51) Int. Cl.
*G06F 21/57* (2013.01)
*H04W 4/00* (2009.01)
*H04W 12/08* (2009.01)

(52) U.S. Cl.
CPC ............ *G06F 21/57* (2013.01); *H04W 4/003* (2013.01); *H04W 12/08* (2013.01)

(58) Field of Classification Search
CPC ........ G06F 21/606; G06F 21/57; G06F 21/53; G06F 21/556; G06F 21/554; G06F 9/544; G06F 2221/2149; H04L 29/08; H04L 29/06979; H04L 29/02; H04W 4/14; H04W 12/08; H04W 4/003

USPC ......... 726/4, 21, 17, 24–30; 455/412.1, 466; 709/229, 232, 238; 713/1, 2, 100
See application file for complete search history.

(56) References Cited

U.S. PATENT DOCUMENTS

| 7,478,173 B1 | 1/2009 | Delco |
| 2004/0203614 A1 | 10/2004 | Qu et al. |
| 2006/0184609 A1* | 8/2006 | Deng ............................. 709/203 |
| 2007/0202884 A1 | 8/2007 | Nykanen et al. |
| 2008/0051122 A1* | 2/2008 | Fisher ........................... 455/466 |

(Continued)

FOREIGN PATENT DOCUMENTS

| EP | 2 173 060 | 4/2010 |
| WO | 2008/077628 | 7/2008 |

OTHER PUBLICATIONS

Operating Systems must support GPU abstractions, Christopher J. Rossbach et al, ACM, 2011.*

(Continued)

*Primary Examiner* — Shanto M Abedin
(74) *Attorney, Agent, or Firm* — MH2 Technology Law Group, LLP (57) ABSTRACT

An electronic module that includes means for determining an operating system targeted by a message received by a transmitter-receiver of an electronic device, from among at least a Rich-OS operating system and a trusted operating system executed on a chipset of the electronic device, so that the message becomes accessible to the targeted operating system. The determining means may be set in operation in response to receipt of the message by the transmitter-receiver.

14 Claims, 5 Drawing Sheets

(56) References Cited

U.S. PATENT DOCUMENTS

| | | | |
|---|---|---|---|
| 2008/0083770 A1* | 4/2008 | Godwin | G07F 17/16 221/9 |
| 2009/0098875 A1 | 4/2009 | De Beer | |
| 2010/0031325 A1* | 2/2010 | Maigne et al. | 726/4 |
| 2010/0333088 A1 | 12/2010 | Rogel et al. | |
| 2011/0066836 A1* | 3/2011 | Iguchi | G06F 9/4406 713/2 |
| 2012/0021785 A1* | 1/2012 | Weinrib | 455/466 |
| 2012/0282954 A1 | 11/2012 | Zhu | |
| 2014/0007120 A1 | 1/2014 | Spitz | |
| 2014/0095918 A1* | 4/2014 | Stahl | G06F 21/725 713/500 |
| 2014/0237621 A1* | 8/2014 | Spitz | G06F 21/62 726/26 |

OTHER PUBLICATIONS

Sung-Min Lee et al, A Multi-Layer Mandatory Access Control Mechanism for Mobile Devices Based on Virtualization, pp. 251-256, IEEE CCNC 2008 proceedings, 2008.*

Search Report dated Sep. 16, 2013 from French Patent Application No. 1261302 filed Nov. 27, 2012. pp. 1-2.

Wolf, Chris. Lets Get Virtual: A Look at Today's Server Virtualization Architecture. Data Center Strategies, In-Depth Research Overview, May 14, 2007, pp. 1-42.

John O'Hara, "Towards a Commodity Enterprise Middleware", ACM Queue, May/Jun. 2007, pp. 1-8.

Preliminary Search Report dated Aug. 22, 2013, French Patent Application No. 1261303, pp. 1-2.

Marcel Selhorst et al., "Towards a Trusted Mobile Desktop", Trust and Trustworthy Computing, Jun. 2010, pp. 1-17.

* cited by examiner

FIG.5B

ELECTRONIC MODULE FOR MAKING A MESSAGE ACCESSIBLE TO A TARGETED OPERATING SYSTEM

CROSS-REFERENCE TO RELATED APPLICATIONS

This Application claims priority to French Patent Application No. 1261302 filed Nov. 27, 2012, the entire disclosure of which is hereby incorporated by reference in its entirety.

BACKGROUND OF THE INVENTION

The present invention lies within the field of the sending and receiving of messages via an electronic device, for example a terminal or smartcard comprising several execution environments of which at least one is a trusted execution environment and another is a Rich-OS execution environment. It is recalled that execution environments, whether trusted or Rich-OS, comprise or are included in electronic assemblies of chipset or System-on-Chip type.

A trusted execution environment is implemented by means of a secure processor, possibly being a processor dedicated to this task or possibly having other functions, and a secure rewrite non-volatile memory; it is based on a trusted operating system.

Similarly, a Rich-OS execution environment is based on a rich operating system allowing the execution of applications of various origins such as the Internet.

At the present time, when a message is received by the transmitter-receiver of an electronic device, it is either transmitted to elements controlled by the Rich-OS operating system executed on this device e.g. a screen or memory, or if the device detects that the message is received by a secure communication it is transmitted to a secure element embedded or inserted in the aforementioned device such as described in document U.S. Patent Application Publication No. 2008/0051122 (FISHER).

However, in the case of an electronic device of the aforementioned type i.e. comprising a trusted execution environment, when a message is intended for the trusted execution environment or one of the applications thereof, it is possible that a malicious application of the Rich-OS operating system retains or destroys the message which is therefore not transmitted to the trusted operating system. In this case the term denial-of-service is used.

There is therefore a need to improve the routing methods of messages intended for a trusted operating system or one of its applications.

OBJECTIVE AND SUMMARY OF THE INVENTION

The present invention mainly sets out to solve the above-mentioned drawbacks.

For this purpose, the invention concerns an electronic module comprising means to determine an operating system targeted by a message received by a transmitter-receiver of an electronic device, from among at least a Rich-OS operating system and a trusted operating system executed on one same chipset of this electronic device, so that the message becomes accessible to the targeted operating system. The determination means being applied in response to receipt of the message by the transmitter-receiver.

This electronic module may be an ASIC for example (Application Specific Integrated Circuit) or a microcontroller. The aforementioned determination means are therefore set in operation directly without any operating system inter-positioned between the determination means and the electronics of the module.

The invention also concerns a routing method implemented by the aforementioned electronic module, the method comprising a step to determine the operating system targeted by a message received by a transmitter-receiver of an electronic device, from among at least a Rich-OS operating system and a trusted operating system executed on one same chipset of this electronic device, so that the message becomes accessible to the targeted operating system; the determination step occurring in response to reception of the message by the transmitter-receiver.

Therefore one of the major advantages of the invention is to prevent denial-of-service for one operating system by another since, in response to receipt of a message, the determination means are set in operation to allow accessibility of the message, the electronic module intercepts the message before it is transmitted to elements controlled by the Rich-OS operating system or one of its applications, as is the case in the prior art, so that the targeted operating system is determined upstream, without any malicious application being able to take possession of the message when it is intended for the trusted operating system or one of the applications thereof.

In one particular embodiment, the electronic module comprises means for making the message available in a memory accessible to the targeted operating system.

For example, when the targeted operating system is the trusted operating system, this memory is a trusted memory to which the Rich-OS operating system does not have access.

In one particular embodiment of the invention, the electronic module further comprises means for initialising a communication channel between the electronic module and the targeted operating system, and means for sending notification of receipt of the message to the targeted operating system via this communication channel.

The use of dedicated channels prevents one of the operating systems or one of the applications thereof from intercepting the message intended for the other operating system. For example, these channels may be logically different or even physically separate.

In one particular embodiment of the invention, the message comprises a frame and the determination means comprise means for reading a recipient field of this frame or of the message to identify the targeted operating system.

The determination means may then also comprise means for obtaining the address of communication means of the execution environment of the targeted operating system, from a destination address included in the recipient field of this frame or of the message, the destination address being read by the reading means.

This address can be obtained for example by reading the address of the communication means in a look-up table memorised in a memory accessible to the trusted operating system.

The invention also covers the routing of messages of the type of those received by the communication protocols used in mobile telephony or any other wireless communication protocol.

In another embodiment of the invention, the determination means comprise means for interpreting a command contained in the message.

Therefore depending on the type of command for example, the determination means are able to infer the operating system that is targeted by the message.

The invention also concerns a transmitter-receiver comprising an electronic module such as aforementioned.

The invention further comprises a terminal comprising a chipset on which a Rich-OS operating system and a trusted operating system are executed, this terminal comprising a transmitter-receiver and an electronic module such as mentioned above. This terminal may be a mobile telephony terminal.

As a variant, this terminal may be a laptop computer or touchpad. The terminal may also be a self-standing or embedded intelligent system widely used in architectures of machine-to-machine type, such as an on-board computer of a vehicle for example.

In one particular embodiment, the electronic module is integrated in the chipset of the terminal.

In one particular embodiment of the invention, the terminal comprises a communication channel between the trusted operating system and the transmitter-receiver, so that the trusted operating system generates a secure message transmitted directly to this transmitter-receiver.

In one particular embodiment of the invention, the steps of the aforementioned method are determined by the instructions of a computer program.

Therefore the invention also concerns a computer program comprising instructions for the implementation of the steps of the method such as described above, when the program is executed by a processor.

This program may use any programming language, for example in the form of a source code or object code. The program can be compiled and/or interpreted or in any other form interpretable by a processor.

The invention also concerns a data medium readable by a computer and comprising the instructions of a computer program such as mentioned above.

This data medium may be any entity or device, embedded or removable, capable of storing the program. For example, the medium may be a storage medium such as a ROM memory, CD-ROM or ROM of a micro-electronic circuit or even magnetic recording means e.g. a hard disk or memory of flash type or RAM.

In addition, the data medium may be a transmissible medium such as an electrical or optical signal which can be conveyed via an electrical or optical cable, via radio or via other means. The program of the invention may in particular be downloaded into an on-line storage space or onto an Internet platform.

Alternatively, the data medium may be an integrated circuit in which the computer program is incorporated, the circuit being adapted to execute or to be used in the execution of the method under consideration.

BRIEF DESCRIPTION OF THE DRAWINGS

Other characteristics and advantages of the present invention will become apparent from the description given below with reference to the appended drawings illustrating an example of embodiment thereof that is in no way limiting. In the Figures.

DETAILED DESCRIPTION OF THE INVENTION

Figure 1A:
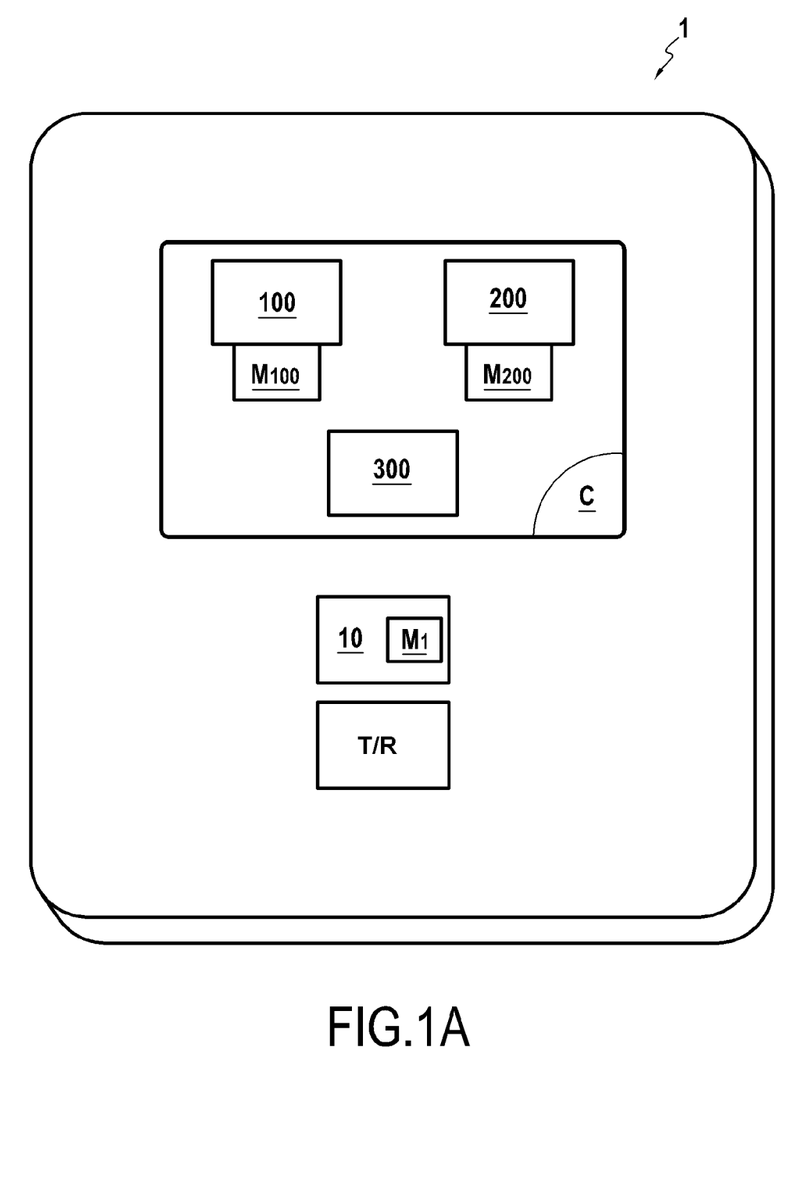
FIGS. 1A, 1B and 1C schematically illustrate an electronic device according to three embodiments of the invention.

FIG. 1A illustrates an electronic device 1 according to one embodiment of the invention. In this example, the electronic device is a terminal e.g. a touchpad, a laptop computer or a mobile telephone.

As a variant it could have been a device of machine-to-machine type such as an-board computer in a vehicle, or a smartcard such as a bank card or electronic identity document.

In the example in FIG. 1A, the terminal comprises an electronic module 10 and a transmitter-receiver T/R. This terminal also comprises a chipset referenced C (this chipset could also be on a System-On-Chip of the terminal) on which two operating systems, namely a Rich-OS operating system 100 and a trusted operating system 200 each having its own memory $M_{100}$ and $M_{200}$ respectively, are executed by the processor 300.

In particular, these two operating systems are jointly set in operation on start-up of the terminal 1. In manner known to persons skilled in the art, the secure execution environment of the trusted operating system 200 has a secure start-up mechanism (Secure Boot) which consists of authenticating the trusted operating system 200, followed by initialisation thereof i.e. launching this system, and then of starting up the Rich-OS operating system 100.

More specifically, the Secure Boot is a chain of steps leading to complete start-up of the terminal, each step validating the following. For example step i+1 is only triggered if step i validates the transition. However the active operation, in opposition to stand-by, of each of the operating systems is exclusive. This means that when one of the operating systems is active, the other is in inactive mode.

In general, the electronic module is a material component comprising a microprocessor. In this embodiment, it comprises its own memory $M_1$ and it can manage the access thereto by one or other of the operating systems.

Therefore, when the transmitter-receiver T/R receives a message, it transmits it directly to the electronic module 10. After determining the recipient of this message, the electronic module 10 can send it directly to the targeted operating system, or as a variant it can place it in the memory $M_1$ so that the operating system can retrieve it later on receipt of notification or on its own initiative as described with reference to FIG. 3B.

This memory $M_1$ may also form a medium for storing the computer program comprising the instructions for implementing the steps of the routing method such as described below with reference to FIGS. 3A and 3B.

Figure 1B:
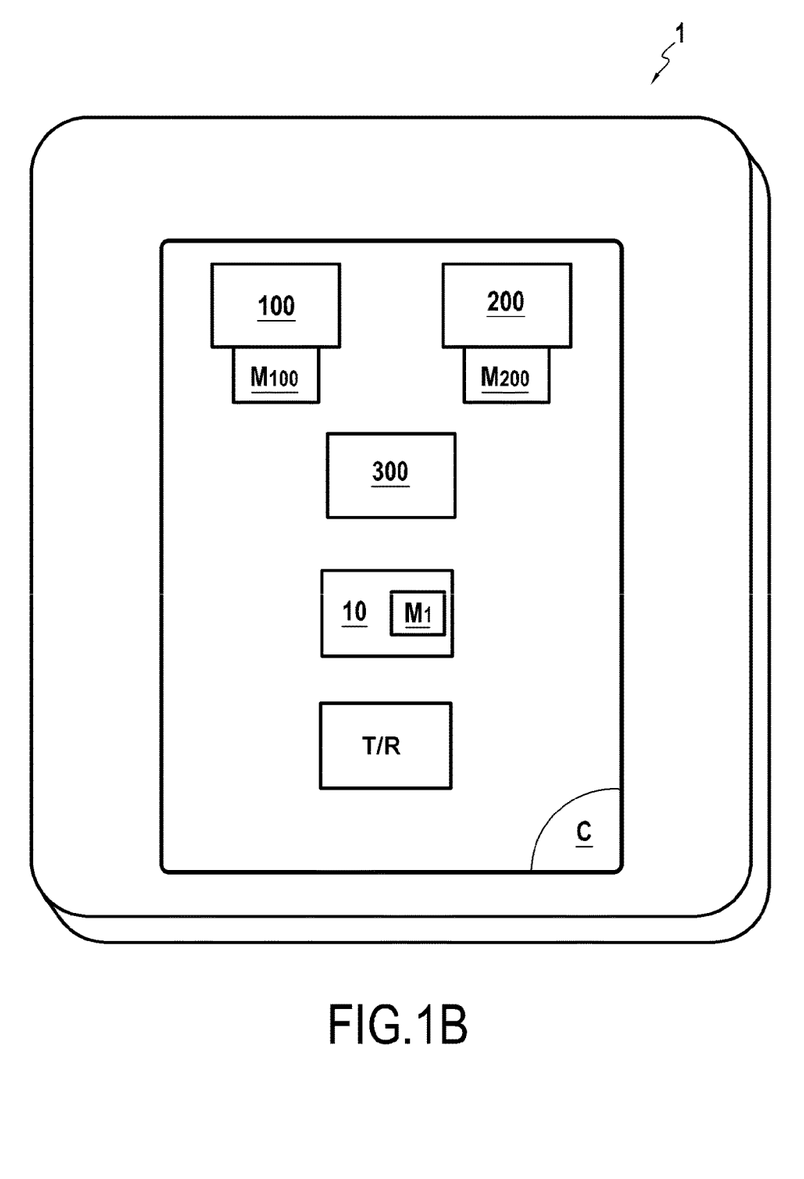

FIG. 1B illustrates a terminal 1 conforming to a second embodiment of the invention. This embodiment differs from the one in FIG. 1A in that the transmitter-receiver T/R and the electronic module 10 are also embedded in the chipset C.

Figure 1C:
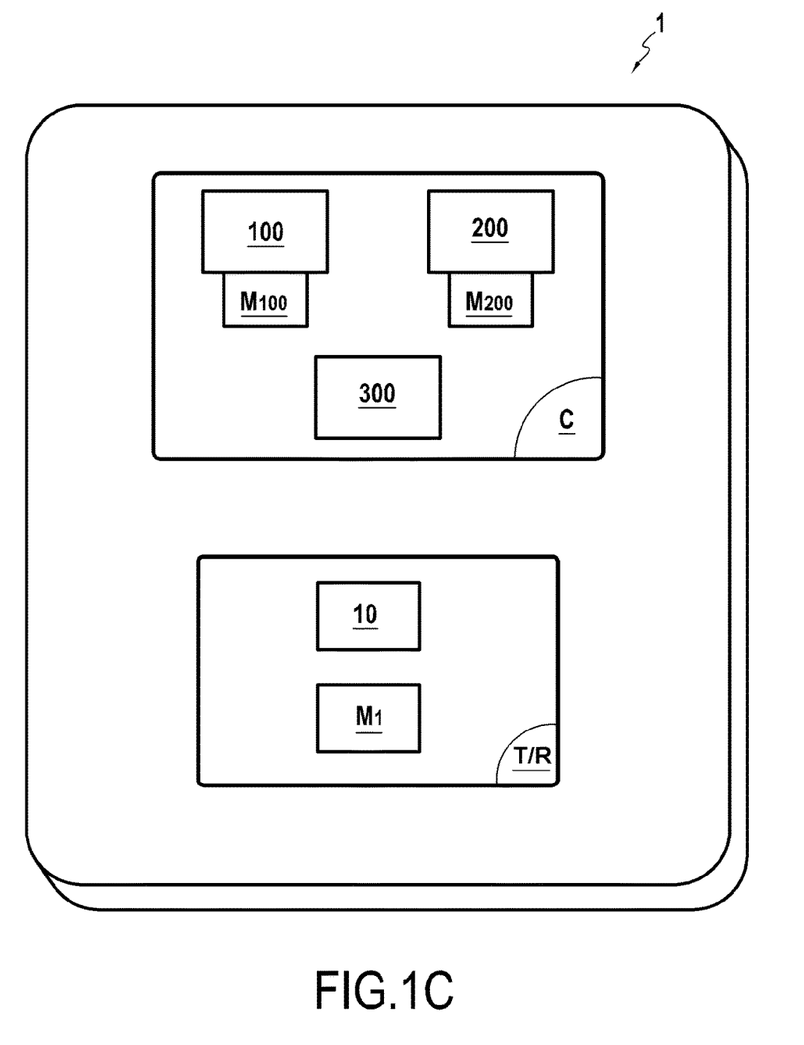

FIG. 1C illustrates a terminal 1 conforming to a third embodiment of the invention. This mode differs from the one in FIG. 1A in that the electronic module 10 is integrated in the transmitter-receiver T/R. The electronic module can therefore use the memory $M_1$ of the transmitter-receiver to place in store the messages which it has routed, or else it may however have its own dedicated memory (this case not illustrated).

Figure 2:
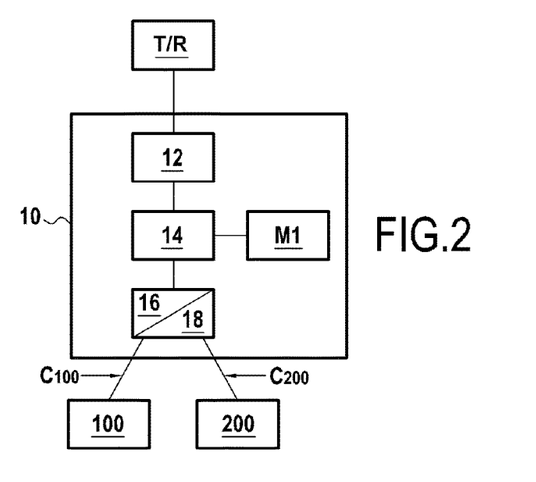
FIG. 2 schematically illustrate the details of an electronic module according to one embodiment of the invention, in its environment.

FIG. 2 shows details of an electronic module 10 according to one embodiment of the invention, in a possible environment which may correspond in particular to one of the architectures illustrated in FIGS. 1A and 1B.

The electronic module comprises means 12 for determining the recipient of a message received by the transmitter-receiver T/R.

It also comprises means 14 for placing the message in store in its memory $M_1$ and means 16 for sending notification of receipt of a message via a channel (denoted $C_{100}$ if it is a channel with the Rich-OS operating system 100 and $C_{200}$ if it is a channel with the trusted operating system 200). This channel having been previously initialised by the initialisation means 18.

More specifically, the initialisation of a channel consists of initialising a context then of starting up a communication session.

Figure 3A:
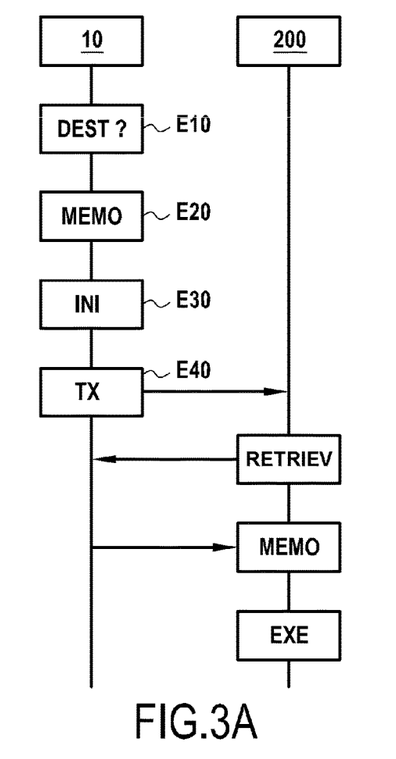
FIG. 3A is a flow chart illustrating the main steps of a routing method which can be implemented by the electronic module in FIG. 2, according to a first embodiment of the invention.

FIG. 3A illustrates the main steps of a routing method according to one particular embodiment of the invention, which can be implemented by an electronic module 10 such as previously described with reference to 2.

In response to receipt of a message by the transmitter-receiver T/R, the determination means 12 of the electronic module 10 at a step E10 determine the operating system targeted by this message.

Figure 4:
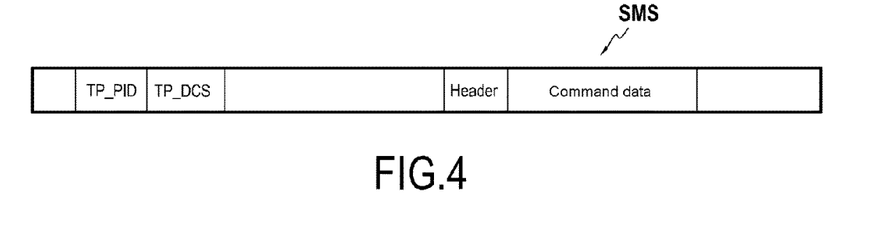
FIGS. 4, 5A and 5B schematically illustrate examples of a message according to the invention, namely SMS frames as per the TCP/IP protocol and Bluetooth.

In a first example, it is assumed that the message is an SMS in PDU mode comprising a TP_DCS field, such as illustrated in FIG. 4.

The present invention proposes modifying the GSM 03.40 standard known to persons skilled in the art, according to which the TP_DCS field is encoded on 8 bits, in order to add a class corresponding to the trusted operating system.

Returning to our first example, the determination means 12 of the electronic module 10 read this TP_DCS field and, by means of the class contained in this field, determine the operating system targeted by this message.

Figure 5A:
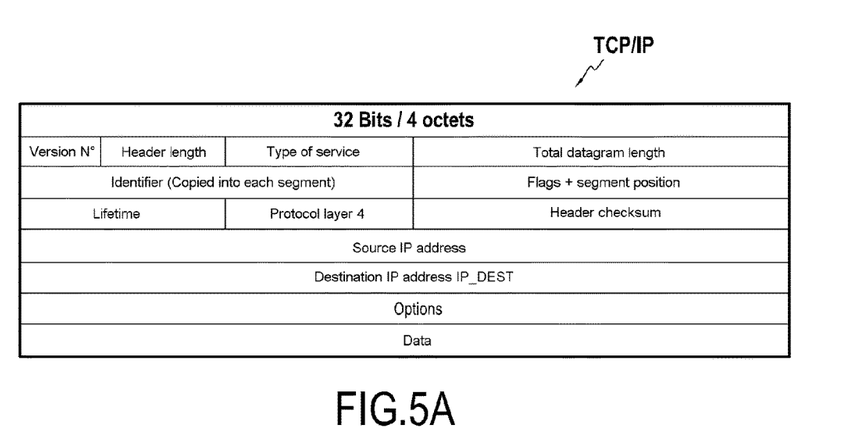

In a second example, it is assumed that the message is a frame as per the TCP/IP protocol comprising an IP_DEST field, such as illustrated in FIG. 5A.

In manner known to persons skilled in the art, this field comprises the IP destination address of the message.

In the context of the invention, the execution environment of the Rich-OS operating system and the execution environment of the trusted operating system each comprise communication means identified by their MAC address (Media Access Control).

Returning to our second example, the determination means 12 of the electronic module 10 read this IP_DEST field.

To identify the targeted operating system, the determination means must obtain the MAC address corresponding to the IP_DEST address.

For this purpose, the electronic module 10 transmits a request of ARP type (Address Resolution Protocol) to the communication means of each of the aforementioned execution environments.

It is specified that in manner known to skilled persons the communication means, having the IP address corresponding to the IP_DEST address, answer the ARP request by specifying their MAC address.

In this manner, the electronic module 10 is able to build an IP/MAC look-up table facilitating subsequent communications of messages.

As a variant, the electronic module could contain a predefined IP/MAC look-up table, so that the determination means 12 would only need to read the MAC address therein corresponding to the IP address in order to identify the targetrd operating system via the communication means of its execution environment.

In practice, once the MAC address of the targeted operating system is obtained, the frame is repackaged into an Ethernet frame with a view to being subsequently transmitted to the communication means characterized by this MAC address.

In general, the routing used in this example is performed on layer 2 of the OSI model.

Figure 5B:
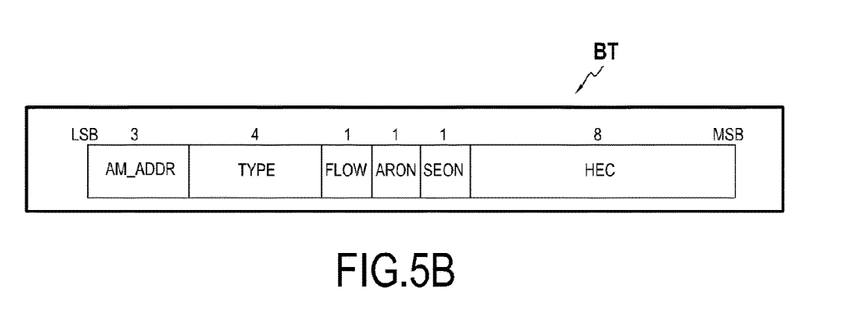

In one possible variant of this second example, the message is not a frame according to the TCP/IP protocol but a Bluetooth BT frame comprising an AM_ADDR field, such as illustrated in FIG. 5B.

In manner known to skilled persons, this AM_ADDR field comprises a local address which characterises a node of the Bluetooth network called Piconet. This local network address is associated with a BD_ADDR address identifying each terminal on initialisation of the Piconet.

In this variant, the electronic module 10 seeks to obtain the BD_ADDR address characteristic of the communication means of the execution environment of the targeted operating system, in similar manner to obtaining the MAC address in the preceding example.

In a third example, the determination means 12 comprise means for interpreting the commands contained in the message. These interpretation means operate on the basis of a list of commands or function signatures, allowing recognition of the targeted operating system in relation to the signature of the command or an imprint contained in the message.

Unlike in the two preceding examples in which the determination of the targeted operating system was based on the interpretation of metadata (recipient field) of the message, determination here is based on interpretation of the data themselves (signature, imprint).

Therefore, according to the secure or non-secure nature of the command for example, the determination means 12 are able to infer therefrom that the trusted operating system is targeted by this message.

In general, the invention covers the determination of the operating system targeted by a message via interpretation of a tag located in the body or header of this message.

The invention also covers the routing of messages of the type of those received by the communication protocols used in mobile telephony or in any other wireless communication protocol.

If, for example, the message is intended for the Rich-OS operating system 100, the electronic module 10 may transmit it directly to this system or as a variant it may place it in storage in a memory to which the Rich-OS operating system 100 has access.

Next, the case is considered in which the message is intended for the trusted operating system 200.

Returning to FIG. 3A, at a step E20 the memorising means 14 of the electronic module 10 memorise the message in the memory $M_1$. At this stage, neither the Rich-OS operating system 100 nor the trusted operating system 200 have been informed of receipt of the said message by the transmitter-receiver.

For the purpose of informing the recipient of the availability of a message intended for it in the memory $M_1$, the initialisation means 18 initialise a communication channel $C_{200}$ with the trusted operating system 200 at a step E30 and the sending means 16 transmit notification of receipt of a message to the trusted operating system 200 at a step E40.

The trusted operating system 200 thus being woken up, one of its particular applications retrieves the message from the memory $M_1$ and places it in its own memory $M_{200}$. A particular application of the system then reads the message and executes the instructions contained therein.

As a variant, the electronic module 10 can configure the access rights to the memory $M_1$ so that only the trusted operating system 200 can have access thereto.

Therefore, a particular application of the trusted operating system 200 reads the message from the memory $M_1$ and then executes the instructions contained therein.

Figure 3B:
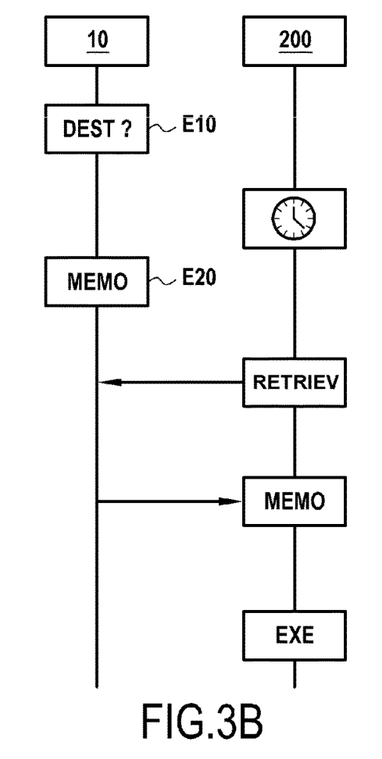
FIG. 3B is a flow chart illustrating the main steps of a routing method according to a second embodiment of the invention.

FIG. 3B illustrates the main steps of a routing method according to a second particular embodiment of the invention.

This embodiment differs from the one in FIG. 3A in that after memorising the message in the memory $M_1$, the electronic module 10 does not send notification of receipt to the trusted operating system 200, which is also the targeted operating system in this example.

In this second embodiment, the trusted operating system 200 regularly consults the memory $M_1$.

In practice, the frequency of consultation can be determined either via a clock marking the switch-over (in active mode) from the Rich-OS operating system 100 to the trusted operating system 200, or via receipt of a specific polling command. This latter case is not illustrated.

As a variant, the consulting of this memory by the trusted operating system 200 can be prompted subsequent to certain action by the user of the terminal or by an application of the Rich-OS operating system.

When the memory $M_1$ contains a message intended for the trusted operating system 200, this system transfers the message to its own memory $M_{200}$ and it is then processed by a particular application.

As a variant, a particular application of the trusted operating system 200 could process the message directly from the memory $M_1$.

The invention also concerns the secure sending of a message originating from the trusted operating system 200, via a channel between this system and the transmitter-receiver T/R.

This channel may be physical or logical. It ensures that the message will not be kept or diverted by the Rich-OS operating system 100.

The Rich-OS operating system 100 and the applications which are executed therein do not have the possibility of commanding the electronic module 10.

In some embodiments the operating systems, and in particular the Rich-OS operating system 100, are unable to send a message or command to the electronic module 10.

What is claimed is:

1. An electronic module comprising:
a microprocessor that:
determines an operating system targeted by a message received by a transmitter-receiver of an electronic device, said operating system being determined from among at least a Rich-OS operating system and a trusted operating system executed on a chipset of said electronic device; and
makes the message accessible to the targeted operating system;

wherein:
the determination of the operating system by the microprocessor is set in operation in response to receipt of the message by the transmitter-receiver;
the Rich-OS operating system, the trusted operating system, and the electronic module are distinct;
the electronic module intercepts the message before the message is transmitted to elements controlled by the Rich-OS operating system or any applications of the Rich-OS operating system; and
the message is only transmitted to the elements controlled by the Rich-OS operating system or any applications of the Rich-OS operating system if the Rich-OS operating system is the operating system targeted by the message; and
wherein:
the microprocessor initializes a communication channel between said electronic module and said operating system targeted by the message, and sends to said operating system targeted by the message, via said communication channel, a notification of receipt of the message, or
the microprocessor memorizes the message in a memory of the electronic module which is accessible by the trusted operating system and not accessible by the Rich-OS.

2. The electronic module according to claim 1, wherein the trusted operating system and the Rich-OS operating system are unable to send a command or a message to the electronic module.

3. The electronic module according to claim 1, wherein the determining of the operating system is set in operation without any operating system inter-positioned between the microprocessor and the electronic module.

4. The electronic module according to claim 1, wherein:
the message comprises a frame, and
the microprocessor reads a recipient field of said frame or said message to identify the targeted operating system.

5. The electronic module according to claim 4, wherein the microprocessor obtains the address of a communications means of the execution environment of the targeted operating system, from a destination address included in the recipient field of said frame or of said message.

6. The electronic module according to claim 1, wherein the microprocessor interprets a command contained in the message.

7. The electronic module according to claim 1, wherein the microprocessor makes said message available in a memory accessible to the targeted operating system.

8. A transmitter-receiver of an electronic device comprising an electronic module including a microprocessor, the microprocessor being configured to:
determine an operating system targeted by a message received by said transmitter-receiver, the operating system being determined from among at least a Rich-OS operating system and a trusted operating system executed on a chipset of said electronic device; and
make the message becomes accessible to the targeted operating system;
wherein:
the determination of the operating system by the microprocessor is set in operation in response to receipt of the message by the transmitter-receiver;
the Rich-OS operating system, the trusted operating system and the electronic module are distinct;
the electronic module intercepts the message before the message is transmitted to elements controlled by the Rich-OS operating system or any applications of the Rich-OS operating system; and the message is only transmitted to the elements controlled by the Rich-OS operating system or any applications of the Rich-OS operating system if the Rich-OS operating system is the operating system targeted by the message; and wherein the microprocessor is further configured to:

initialize a communication channel between said electronic module and said operating system targeted by the message, and send to said operating system targeted by the message, via said communication channel, a notification of receipt of the message; or memorize the message in a memory of the electronic module which is accessible by the trusted operating system and not accessible by the Rich-OS.

9. A terminal comprising:

a chipset, on which a Rich-OS operating system and a trusted operating system are executed, a transmitter-receiver, and an electronic module, wherein the electronic module includes a microprocessor that:

determines an operating system targeted by a message received by the transmitter-receiver, the operating system being determined from among at least a Rich-OS operating system and a trusted operating system executed on the chipset, and makes the message accessible to the targeted operating system, wherein:

the determination of the operating system by the microprocessor is set in operation in response to receipt of the message by the transmitter-receiver, the Rich-OS operating system, the trusted operating system and the electronic module are distinct;

the electronic module intercepts the message before the message is transmitted to elements controlled by the Rich-OS operating system or any applications of the Rich-OS operating system; and the message is only transmitted to the elements controlled by the Rich-OS operating system or any applications of the Rich-OS operating system if the Rich-OS operating system is the operating system targeted by the message, and wherein:

the microprocessor initializes a communication channel between said electronic module and said operating system targeted by the message, and sends to said operating system targeted by the message, via said communication channel, a notification of receipt of the message, or the microprocessor memorizes the message in a memory of the electronic module which is accessible by the trusted operating system and not accessible by the Rich-OS.

10. The terminal according to claim 9, wherein the electronic module is integrated in the chipset.

11. The terminal according to claim 9, wherein the terminal is a mobile telephony terminal.

12. A terminal comprising:

a chipset, on which a Rich-OS operating system and a trusted operating system are executed, a transmitter-receiver, an electronic module, and a communication channel between said trusted operating system and said transmitter-receiver, so that the trusted operating system generates a secure message transmitted directly to the transmitter-receiver, wherein the electronic module includes a microprocessor that:

determines an operating system targeted by a message received by the transmitter-receiver, the operating system being determined from among at least a Rich-OS operating system and a trusted operating system executed on the chipset, and makes the message accessible to the targeted operating system, wherein the determination of the operating system by the microprocessor is set in operation in response to receipt of the message by the transmitter-receiver, wherein the Rich-OS operating system, the trusted operating system and the electronic module are distinct; and wherein the electronic module intercepts the message before the message is transmitted to elements controlled by the Rich-OS operating system or any applications of the Rich-OS operating system.

13. A message routing method implemented by an electronic module, the method comprising:

determining, by a microprocessor, an operating system targeted by a message received by a transmitter-receiver of an electronic device, said operating system being determined from among at least a Rich-OS operating system and a trusted operating system executed on a chipset of said electronic device; and making, by the microprocessor, the message accessible to said targeted operating system, wherein:

the determining operates in response to receipt of the message by the transmitter-receiver, the Rich-OS operating system, the trusted operating system and the electronic module are distinct;

the electronic module intercepts the message before the message is transmitted to elements controlled by the Rich-OS operating system or any applications of the Rich-OS operating system;

the message is only transmitted to the elements controlled by the Rich-OS operating system or any applications of the Rich-OS operating system if the Rich-OS operating system is the operating system targeted by the message, and wherein:

the microprocessor initializes a communication channel between said electronic module and said operating system targeted by the message, and sends to said operating system targeted by the message, via said communication channel, a notification of receipt of the message, or the microprocessor memorizes the message in a memory of the electronic module which is accessible by the trusted operating system and not accessible by the Rich-OS.

14. A non-transitory computer-readable medium comprising instructions that, when executed by a processor, perform a method comprising:

determining an operating system targeted by a message received by a transmitter-receiver of an electronic device, said operating system being determined from among at least a Rich-OS operating system and a trusted operating system executed on a chipset of the electronic device, wherein:

the message becomes accessible to said targeted operating system, the determining operates in response to receipt of the message by the transmitter-receiver, the Rich-OS operating system, the trusted operating system and the electronic module are distinct;

the electronic module intercepts the message before the message is transmitted to elements controlled by the Rich-OS operating system or any applications of the Rich-OS operating system; and the message is only transmitted to the elements controlled by the Rich-OS operating system or any applications of the Rich-OS operating system if the Rich-OS operating system is the operating system targeted by the message, and wherein:

the microprocessor initializes a communication channel between said electronic module and said operating system targeted by the message, and sends to said operating system targeted by the message, via said communication channel, a notification of receipt of the message, or the microprocessor memorizes the message in a memory of the electronic module which is accessible by the trusted operating system and not accessible by the Rich-OS.

\* \* \* \* \*